(12) United States Patent
Terho et al.

(10) Patent No.: US 10,697,363 B2
(45) Date of Patent: Jun. 30, 2020

(54) COMBINED HEAT AND POWER PLANT AND A METHOD FOR IMPROVING THE BURNING PROCESS IN A COMBINED HEAT AND POWER PLANT

(71) Applicant: Volter Oy, Tupos (FI)

(72) Inventors: Esa Terho, Ruuki (FI); Jani Kaaresto, Kiiminki (FI); Iikka Ylikoski, Kempele (FI); Iikka Korva, Lumijoki (FI); Jarno Haapakoski, Kempele (FI)

(73) Assignee: Volter Oy, Tupos (FI)

( * ) Notice: Subject to any disclaimer, the term of this patent is extended or adjusted under 35 U.S.C. 154(b) by 0 days.

(21) Appl. No.: 16/324,581

(22) PCT Filed: Aug. 25, 2016

(86) PCT No.: PCT/FI2016/050581
§ 371 (c)(1),
(2) Date: Feb. 11, 2019

(87) PCT Pub. No.: WO2018/037152
PCT Pub. Date: Mar. 1, 2018

(65) Prior Publication Data
US 2019/0178153 A1    Jun. 13, 2019

(51) Int. Cl.
*F02B 43/08* (2006.01)
*C10J 3/86* (2006.01)
(Continued)

(52) U.S. Cl.
CPC .............. *F02B 43/08* (2013.01); *C10J 3/84* (2013.01); *C10J 3/86* (2013.01); *F02B 43/00* (2013.01);
(Continued)

(58) Field of Classification Search
CPC ... F02B 43/08; F02B 45/08; C10J 3/86; C10J 3/84; C10J 2300/1653; C10J 2300/1606;
(Continued)

(56) References Cited

U.S. PATENT DOCUMENTS

| 2011/0179762 A1 | 7/2011 | Kim |
| 2012/0056431 A1* | 3/2012 | Bland ............... C10L 5/366 |
| | | 290/52 |
| 2012/0238645 A1 | 9/2012 | Rûdlinger |

FOREIGN PATENT DOCUMENTS

WO    2012010742 A2    1/2012

OTHER PUBLICATIONS

Written Opinion of PCTFI2016050581 issued by European Patent Office dated Apr. 28, 2017, 8 pages.

* cited by examiner

*Primary Examiner* — Jacob M Amick
(74) *Attorney, Agent, or Firm* — Berggren LLP

(57) ABSTRACT

A combined heat and power plant includes a gasifier, a heat exchanger arranged to reduce the temperature of the raw synthesis gas formed in the gasifier by exchanging the heat of the raw synthesis gas into heating medium used for heating and forming cooled raw synthesis gas, a filtration unit for cleaning the cooled raw synthesis gas to form refined synthesis gas suitable as a fuel for an internal combustion engine, an internal combustion engine where the refined synthesis gas is burnt to produce mechanical power, ducts for connecting different parts of the plant to each other a raw gas burner arranged after the gasifier to burn the raw synthesis gas formed in the gasifier during the time when the refined synthesis gas is not utilized in the internal combustion engine. A method for treating raw synthesis gas a combined heat and power plant is also disclosed.

19 Claims, 2 Drawing Sheets

(51) Int. Cl.
- *C10J 3/84* (2006.01)
- *F22B 1/18* (2006.01)
- *F02B 43/00* (2006.01)
- *F24H 1/12* (2006.01)
- F28D 21/00 (2006.01)
- F24H 1/24 (2006.01)
- F02B 45/08 (2006.01)

(52) U.S. Cl.
CPC ............... *F22B 1/18* (2013.01); *F24H 1/127* (2013.01); *C10J 2300/0913* (2013.01); *C10J 2300/1215* (2013.01); *C10J 2300/164* (2013.01); *C10J 2300/165* (2013.01); *C10J 2300/1606* (2013.01); *C10J 2300/1618* (2013.01); *C10J 2300/1653* (2013.01); *C10J 2300/1671* (2013.01); *C10J 2300/1884* (2013.01); *F02B 45/08* (2013.01); *F24D 2200/065* (2013.01); *F24H 1/24* (2013.01); *F24H 2240/02* (2013.01); *F28D 2021/0075* (2013.01); *Y02E 20/18* (2013.01); *Y02P 20/13* (2015.11); *Y02T 10/32* (2013.01)

(58) Field of Classification Search
CPC .......... C10J 2300/1671; C10J 2300/165; C10J 2300/1884; C10J 2300/16; C10J 2300/18; C10J 2300/1215; C10J 2300/164; C10J 2300/1643; C10J 2300/0913; C10J 2300/0916; C10J 2300/092; C10J 2300/0923

See application file for complete search history.

COMBINED HEAT AND POWER PLANT AND A METHOD FOR IMPROVING THE BURNING PROCESS IN A COMBINED HEAT AND POWER PLANT

PRIORITY

This application is a U.S national application of the international application number PCT/FI2016/050581 filed on Aug. 25, 2016.

THE OBJECT OF THE INVENTION

The invention relates to a combined heat and power plant and a method for improving the burning process in and a combined heat and power plant.

BACKGROUND OF THE INVENTION

Synthesis gas produced from different kinds of carbonaceous material such as wood chips, wood waste and various forms of biomass, including municipal and other wastes by a gasifier is utilized in combined heat and power plants (CHP plants) for generation of heat and electricity. One type of such plant raw synthesis gas is produced by burning carbonaceous material under oxygen limited environment in a gasifier after which the temperature of the hot raw gas is reduced in a heat exchanger, cleaned in a filtration unit and/or cyclone before utilization as a fuel for an internal combustion engine to produce electricity. In present CHP plants it is not possible to produce pure heat because the raw gas need to be always used for generating electricity by means of an internal combustion engine.

In known CHP plants the excess synthesis gas is typically burnt in a flare burner which is placed next to the gasifier. A drawback of such arrangement is that harmful emissions is formed by burning the raw gas containing incombustible contamination. Furthermore, in such plant there has to be at least two exhaust gas ducts; one for the raw gas burner and the other for the internal combustion engine.

BRIEF DESCRIPTION OF THE INVENTION

The object of the invention is to improve the burning processes in a CHP plant based on gasification of carbonaceous material in a gasifier. Especially the aim of the invention is to reduce harmful emissions caused by burning the excess uncleaned synthesis gas in such CHP plant. Furthermore, the aim of the invention is to improve the efficiency of a CHP plant by making it possible to produce pure heat also during the periods when the mechanical power and electricity is not generated.

The aim of the invention is achieved because the raw gas burner for burning the raw synthesis gas is provided in connection with a heat exchanger for cooling the raw gas such that heating medium of the heat exchanger which is primarily heated by the hot raw gas being cooled, is also heated by a burner being arranged to burn the raw gas produced in the gasifier. To put it more precisely the combined heat and power plant according to the invention is characterized by the combined heat and power plant according to the independent claim 1. The method for improving the burning process in a combined heat and power plant is characterized by the method according to independent claim 11. The dependent claims 2-10 describe advantageous embodiments of the combined heat and power plant according to the invention. The dependent claims 12-19 describes the advantageous embodiments of the method for improving the burning process in a combined heat and power plant according to the invention.

The advantage of the invention is that the utilization degree of the energy content of carbonaceous material used in this type of CHP plant is improved, because the energy of the raw synthesis gas can be utilized also in production of pure heat in such CHP plant. Furthermore, the invention makes it possible to clean the exhaust gas formed in the raw gas burner by using the same filtration unit that is used for filtration of the raw synthesis gas being used as fuel for internal combustion engine which reduces the emissions released in to the environment in case when the raw gas is burnt in a raw gas burner placed after the gasifier.

BRIEF DESCRIPTION OF THE DRAWINGS

In the following some advantageous embodiments of the invention is described in more detail with reference to the appended drawings, in which.

DETAILED DESCRIPTION OF SOME ADVANTAGEOUS EMBODIMENTS OF THE INVENTION

Figure 1:
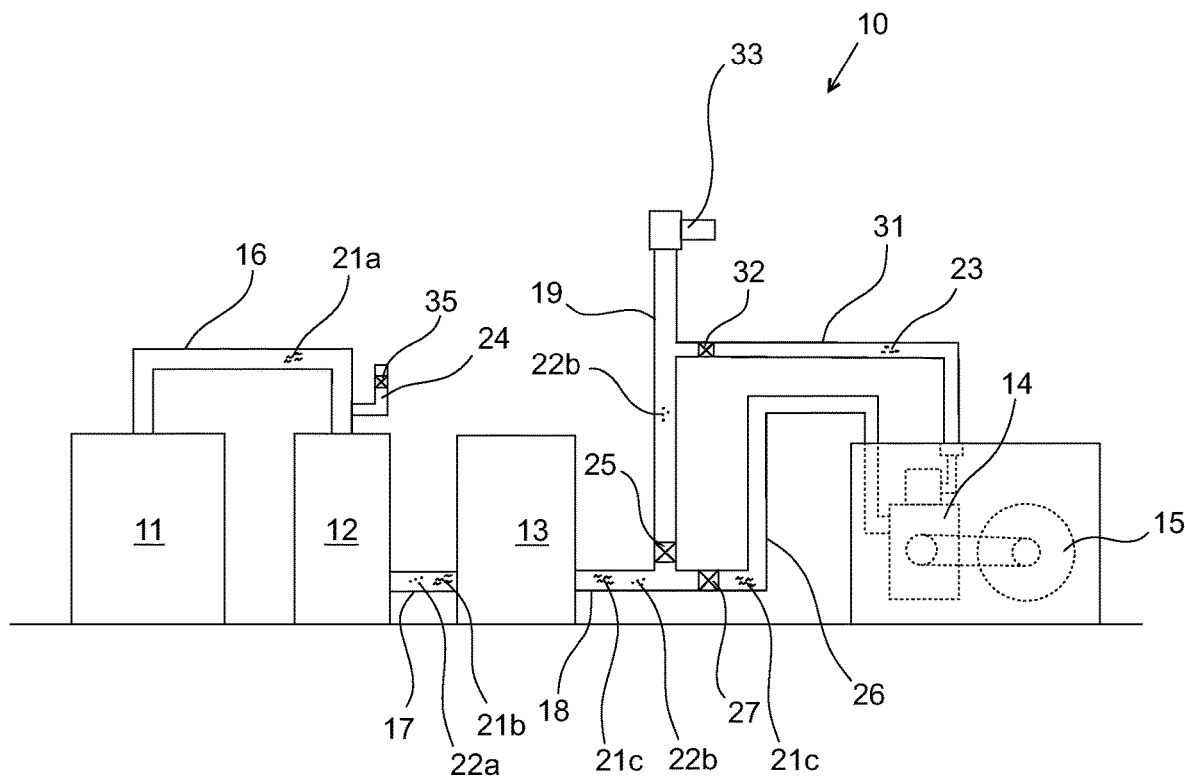
FIG. 1 shows a principal drawing of an embodiment of the combined heat and power plant according to the invention.

The combined heat and power plant 10 shown in the FIG. 1 comprises a gasifier 11, a heat exchanger 12, a filtration unit 13, an internal combustion engine 14 and a generator 15 to which the internal combustion engine 14 is connected by means of suitable mechanical transmission means. The combined heat and power plant 10 shown in the FIG. 1 comprises also ducts for connecting the above mentioned components of the plant 10 to each other. These include a first raw gas duct 16 from the gasifier 11 to the heat exchanger 12, a second raw gas duct 17 from the heat exchanger 12 to the filtration unit 13, a refined gas duct 18 from the filtration unit 13 to the to the internal combustion 14 engine. Furthermore, the combined heat and power plant 10 comprises an exhaust gas duct 19 to which the cooled and cleaned exhaust gas 22b coming from raw gas burner 20 is conducted through the refined gas duct 18 and to which the exhaust gas 23 coming from the internal combustion engine 14 is conducted through an exhaust gas connection duct 31.

In the combined heat and power plant 10 the raw gas burner 20 being after the gasifier 11 is arranged to burn the raw gas 21 formed in the gasifier 11 during the time when refined gas 21c produced in the combined heat and power plant 10 is not utilized in its internal combustion engine 14. For this reason, the refined gas duct 18 is connected to the exhaust gas duct 19 through a shut-off valve 25 to prevent the refined synthesis gas 21c from entering to the exhaust gas duct 18 during the use of internal combustion engine 14. Furthermore, the refined gas duct 18 is connected to the internal combustion engine 14 through a refined gas connection duct 26 having a shut-off valve 27 to prevent the cooled and filtered exhaust gas 22b flowing through the refined gas duct 18 to the exhaust gas duct 19 from entering to the internal combustion engine 14 during the use of raw gas burner 20.

The gasifier 11 is a gasifier known as such (e.g. such as described in the applicants Finnish patent no. 123804) being arranged to convert carbonaceous material being burnt in limiting oxygen environment in to raw synthesis gas. After gasification the hot raw synthesis gas 21a is conducted through the first raw gas duct 16 to the raw gas burner 20 arranged in connection with the heat exchanger 12.

The raw gas burner 20 comprises a burning chamber 34 enclosed by walls 28 in to which channels 36 for heating medium has been arranged such that the thermal energy formed in burning process can be recovered in to the heating medium circulated in the heating medium channels 36. Such arrangement, in turn, reduces the temperature of the exhaust gas formed in the burning process already in the burning chamber 34.

The raw gas burner 20 comprises also an air-inlet 24 through which suitable amount of air is provided in to the burning chamber 34 of the raw gas burner 20 during the burning of the raw gas 21a. The air-inlet 24 is e.g. a duct lead from outside of the raw gas burner to the burning chamber. The air-inlet 24 may comprise adjustment valve 35 or corresponding means to adjust the amount of air to be provided in to the burning chamber 34 in order to ensure that suitable amount of oxygen is available in the burning chamber so that the raw synthesis gas 21a is burnt in the raw gas burner 12 as completely as possible. During the periods when the raw synthesis gas 21a is not burnt in the raw gas burner 20 the adjustment valve 35 is closed so that raw synthesis gas cannot flow out from the first raw gas duct 16 before it enters in to the heat exchanger 12. Furthermore, in the burning chamber 34 it is arranged suitable ignition means for igniting the hot raw synthesis gas 21a when it is burnt by the raw gas burner 20. The shut-down of the raw gas burner 20 is accomplished, in this embodiment, by closing the adjustment valve 35 which causes the burning process in the burning chamber 34 to stop.

In this embodiment the heat exchanger 12 is formed of two sections arranged in to a single casing. As shown in the FIG. 2 the raw gas burner 20 is arranged in to the first section 29. The heat formed in the raw gas burner 20 is exchanged to heating medium circulated in medium channels 36 and 37 of the heat exchanger 12. In the first section the heating medium channels 36 are arranged, for example, in to the walls of the burning chamber 20. In the second section 30 the heating medium channels 37 are arranged in the heating medium tubing 38 through which the hot raw gas 21a or hot exhaust gases 22a formed in the raw gas burner 20 is arranged to flow during the use of the plant 10. Thus, the heating medium channels 36 and 37 reduces the temperature of the hot raw gas 21a or exhaust gas 22a formed in the raw gas burner (i.e. in the first section of the heat exchanger) by exchanging the heat of the raw gas 21a or exhaust gas 22a in to heating medium flowing in the heating medium channels 36 and 37 of the first section 29 and the second section 30 respectively. As such the heat exchanger 12 can be, for example a boiling heat exchanger which has such operating principle as the boiling heat exchanger described e.g. in the applicants patent application publication WO2012/010742 A2. After heating the heated heating medium is conducted outside the heat exchanger 12, for instance in to a heat accumulator arranged in to a suitable place, or directly outside the plant 10 where it can be used for heating items to be heated such as e.g. houses or buildings.

Filtration unit 13 is arranged to clean the cooled raw synthesis gas 21b to form refined synthesis gas 21c suitable as a fuel for the internal combustion engine 14. In this embodiment the filtration unit 13 comprises chamber in to which a fabric filter is positioned such that cooled raw synthesis gas 21b or cooled exhaust gas 22a entering to the filtration unit flow through the filter before exiting from the filtration unit. The filter is made of e.g. some suitable filter cloth which is folded in such way that cooled raw gas 21b or cooled exhaust gas 22a flowing through the filter flows through several cloth layers between the enter and exit of the filtration unit. Thus, the filter removes the most of the ash soot and the other contamination from either the cooled raw synthesis gas 21b or cooled exhaust gas 22a. Hence, when the hot raw synthesis gas 21a is not burnt in the raw gas burner 20 refined gas 21c is formed when the cooled raw synthesis gas 21b flows through the filter of the filtration unit. In other hand, if the hot raw synthesis gas 21a coming from the gasifier 11 is burnt in the raw gas burner 20 the cooled exhaust gas 22a is cleaned to form where it contains much less contamination after the filtration than the cooled exhaust gas 22a before filtration. Therefore, remarkably less harmful emissions are released to the environment than in case if the raw gas is burnt without recovering the heat of the exhaust gas 22a in the heat exchanger 12 and without cleaning the exhaust gas 22a in the filtration unit 13 as the case is with the state of the art CHP plants of this type. The filter of the filtration unit may be also a filter made of some other material than cloth such as e.g. a filter made of some suitable ceramic material.

In the internal combustion engine 14 the refined synthesis gas 21c is burnt to run the engine and to get mechanical power for producing electrical energy by the generator 15. Thus, in this embodiment the internal combustion engine 14 is connected to a generator 15 via a suitable power transmission means. The internal combustion engine 14 is an internal combustion engine known as such and which is configured to be suitable for using refined synthesis gas as its fuel. The internal combustion engine 14 may comprise also suitable adjustment means to feed the fuel and air in to its cylinders in an appropriate way to optimise its energy efficiency.

When the internal combustion engine 14 runs it produces exhaust gas 23. The exhaust gas 23 is also conducted to the exhaust gas duct 19 of the plant 10 via an exhaust gas connection duct 31. Thus, the exhaust gas duct 19 can be considered as common for the both raw gas burner 20 and the internal combustion engine 14.

The exhaust gas connection 31 duct has a shut-off valve 32 to prevent exhaust gas 22b coming from the refined gas duct 17 to the exhaust gas duct 18 from entering to the internal combustion engine 14 through the exhaust gas connection duct 31 during the use of the raw gas burner 11. The shut-off valves 27 and 32 are closed when the internal combustion engine 14 is not used and when the hot raw gas 21a is burnt in the raw gas burner 20.

The exhaust gas duct 19 has its (upper) end a flare blower 33. The flare blower 33 ensures that the exhaust gases 22b and 23 formed in the the plant exit from the exhaust gas duct 19 and that the gases 21a-c, 22a, 22b and 23 flow in the ducts of plant 10 in appropriate manner. By making the exhaust gas duct 19 tall enough the flow of the gases can be enhanced also by means of gravity force.

When using the combined heat and power plant 10 according to FIG. 1 the carbonaceous material is burnt in the gasifier 11 under limiting oxygen environment to produce raw synthesis gas 21a. In such periods when the user desires to produce both the electricity and the heat the raw synthesis gas 21a is not burnt in the raw gas burner 20 but is conducted through the heat exchanger 12 to reduce the temperature of hot raw synthesis gas 21a. Temperature of the raw synthesis gas 21a is typically about 400 to 650° C. before entering in to the heat exchanger but reduces to temperature under 250° C. (typically between 200-250° C. depending on the use of heat and production of the hot raw gas 21a) when flowing through the heat exchanger 12. Such a temperature reduction makes it possible that the raw synthesis gas 21a can be filtered by using fabric filters. Thus, after the heat exchanger 12 the cooled raw synthesis gas 21b is lead in to the filtration unit 13 wherein the contaminants are removed from the gas. After filtration such grade of synthesis gas (i.e. refined synthesis gas 21c) is obtained which can be used as fuel of the internal combustion engine 14. To conduct the refined synthesis gas 21c in to the internal combustion engine 14 the shut of valve 25 of the exhaust gas duct 19 is closed and the shut-off valve 27 of the refined gas connection duct 26 as well as the shut-off valve 32 of exhaust gas connection duct 31 are opened. The amount of heat and electricity produced depends on the amount of gas produced in the gasifier 11. Thus, by adjusting the feed rate of the carbonaceous material being burnt in the gasifier 11 can be used for controlling the total amount of energy being produced by the CHP plant 10 shown in FIG. 1.

When the internal combustion engine 14 is not used and electrical energy is not produced but the hot raw gas formed in the gasifier 11 is used for production of pure heat. In this mode of operation the adjustment valve 33 of the air-inlet 24 is opened and the hot raw gas 21a coming from the gasifier 11 is ignited by ignition means in the burning chamber 34. The shut-off valve 25 of the exhaust gas duct is opened and the shut-off valves 27 and 33 are closed to so that cooled and filtered exhaust gas 22b cannot enter in to the internal combustion engine 14. Thus, whole energy content of the hot raw synthesis gas produced by the gasifier 11 as well as the heat of the raw gas itself is utilized in heating the heating medium circulated in the heating medium channels 36 and 37 of the heat exchanger 12. As described above the exhaust gas 22a of the raw gas burner is thus cooled in the heat exchanger 12 and cleaned in the filtration unit 13 before it is released outside the CHP plant 10 through the common exhaust gas duct 19. Thus, in addition to reduction of harmful emissions the inventive concept of CHP plant according to FIG. 1 improves the energy efficiency of this type of the CHP plants.

The combined heat and power plant according to the invention can be implemented in many ways different from the example embodiment described above. The heat exchanger can be formed e.g. by having raw gas burner which is separate from the heat exchanger. In such CHP plant the heat exchanger can be similar as e.g. the heat exchanger described in the applicants patent application publication WO2012/010742 A2 and the raw gas burner is formed in a separate casing which is connected to the first raw gas duct by means of separate input and output ducts as well as a by-pass duct which all can comprise shut-off valves such a way that when the raw synthesis gas coming from gasifier is used for production of electricity it can be guided directly to the heat exchanger through the by-pass duct and when the raw synthesis gas is burnt in the raw gas burner the shut-off valve of by-pass duct is closed and the shut-off valves of the input duct and output duct are opened so that raw synthesis gas can be guided in to the raw gas burner and the exhaust gas from raw gas burner in to the heat exchanger. In such embodiment the raw gas burner may comprise separate heating medium channels that are arranged in suitable in to the walls of the raw gas burner. Alternatively the raw gas burner may be such that it does not comprise heating medium channels but the hot exhaust gas can be lead in to the heat exchanger through thermal insulated output duct so that heat losses does not happen between the raw gas burner and the heat exchanger. The raw gas burner may also comprise more than one air-inlets. In some embodiment the raw gas burner comprises plurality of air-inlets placed around the input duct such that the air streams in to the burning chamber is distributed evenly in to the different sides of the burning chamber. Such air-inlets can have separate or common adjustment valves to control of amount of air being provided in to the burning chamber of the raw gas burner to optimize the burning process in the burning chamber.

Figure 2:
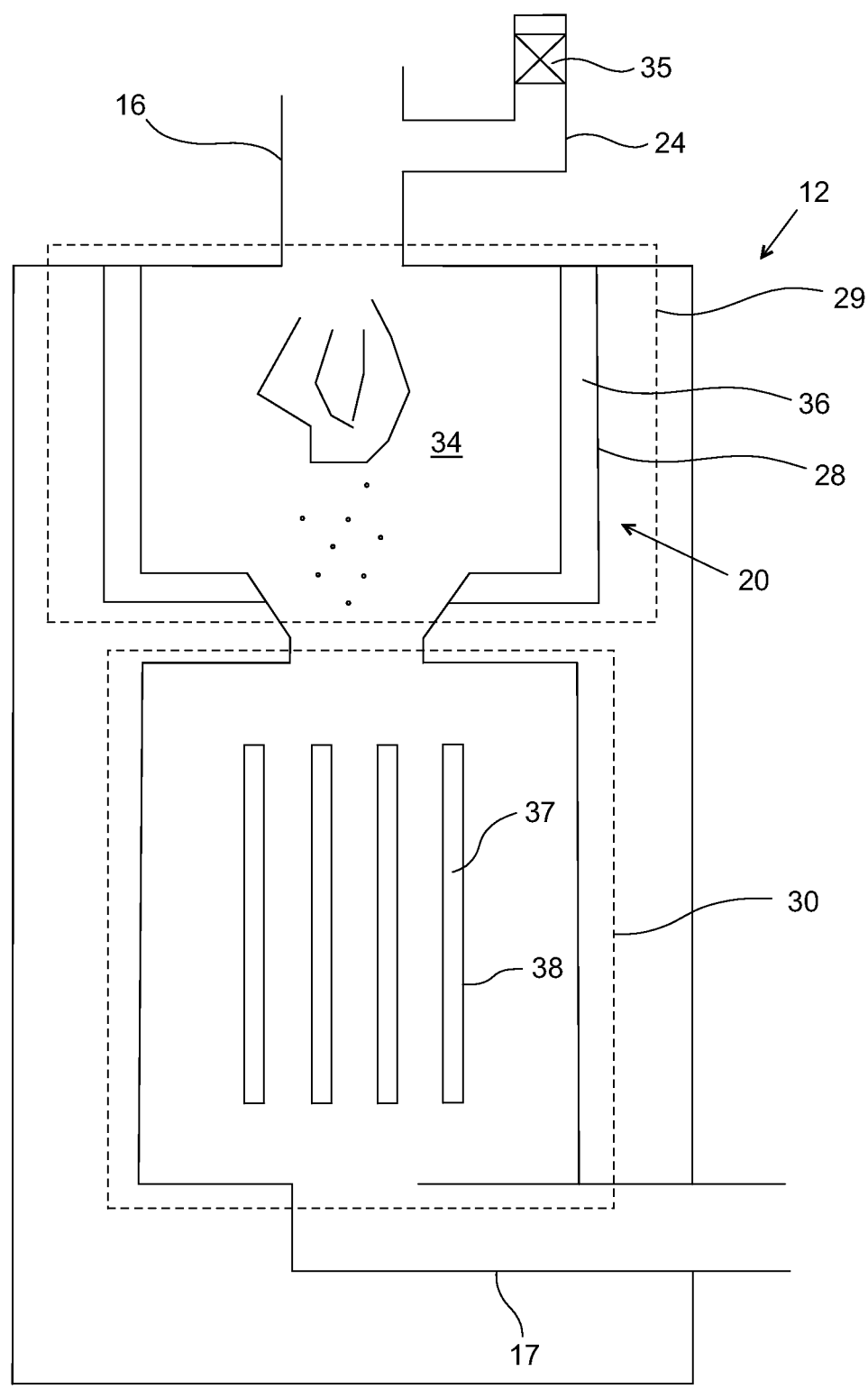
FIG. 2 shows a cross section of a heat exchanger of the combined heat and power plant according to FIG. 1.

Also the other parts of the CHP plant according to the present invention than the heat exchanger and the raw gas burner can be realized differently from that of the above described embodiment. For instance, in the kind embodiments shown in the FIGS. 1 and 2 the shut-off valve 25 in the exhaust gas duct 19 as well as the shut-off valve 27 in the raw gas connection duct 26 can be replaced with one two-way directional valve which in its first position guides the exhaust gas coming from refined gas duct 18 to the exhaust gas duct 19 and in its second position guides the refined synthesis gas 21c coming from refined gas duct 18 in to the internal combustion engine 14 through the refined gas connection duct 26. Also the filtration unit can be based on other filtration method than the one having a fabric filter. Thus the filtration unit can comprise e.g. a cyclone and/or electrostatic filter or some other type of filtration apparatuses such as e.g. settling chambers or baffle chambers which enables good enough collection of contamination in gases having temperature less than 250° C. Furthermore, although the same filtration unit apply in the most cases for both the cooled raw gas and for the cooled exhaust gas of the raw gas burner, in some embodiments, the combined power plant according to invention can comprise a second filtration unit which would be, in such kind of embodiment as shown in FIGS. 1 and 2, connected by an input duct to the second raw gas duct and by an output duct to the refined gas duct. Thus, by the such combined power plant the cooled raw synthesis can be filtered by the first filtration unit and the cooled exhaust gas coming from the raw gas burner through the heat exchanger can be filtered in the second filtration unit (or vice versa). This arrangement is advantageous since the cooled exhaust gas may sometimes have significant higher temperature than cooled raw gas and hence the filtration unit used for the cooled exhaust gas can be provided with a filter type that can stand remarkably higher temperatures than those type of filters being designed for gases having temperature of the cooled raw gas before filtration. Therefore, the invention is not limited to the advantageous embodiments described above but can be varied within the scope of the appended claims.

The invention claimed is:

1. A combined heat and power plant, comprising:
a gasifier for converting a carbonaceous material into raw synthesis gas,
a heat exchanger arranged to reduce the temperature of the raw synthesis gas formed in the gasifier by exchanging the heat of the raw synthesis gas into a heating medium to be used for heating and thereby forming cooled raw synthesis gas,
a filtration unit for cleaning the cooled raw synthesis gas to form refined synthesis gas suitable as a fuel for an internal combustion engine,
an internal combustion engine, wherein the refined synthesis gas is burnt to produce mechanical power,
ducts for connecting different parts of the plant to each other, including a first raw gas duct led from the gasifier to the heat exchanger, a second raw gas duct led from heat exchanger to the filtration unit, a refined gas duct led from the filtration unit to the internal combustion engine and an exhaust gas duct to which the exhaust gas of the internal combustion engine is conducted, a raw gas burner arranged after the gasifier to burn the raw synthesis gas formed in the gasifier during the time when the refined synthesis gas is not utilized in the internal combustion engine, wherein the raw gas burner is arranged to heat the heating medium of the heat exchanger; and the refined gas duct is connected to the exhaust gas duct through a shut-off valve to prevent the refined synthesis gas from entering the exhaust gas duct during the use of internal combustion engine;

the refined gas duct is connected to the internal combustion engine through a refined gas connection duct having a shut-off valve to prevent the cooled and filtered exhaust gas flowing through the refined gas duct to the exhaust gas duct from entering the internal combustion engine during the use of the raw gas burner; or the refined gas duct is connected to the exhaust gas duct and to the refined gas connection duct through one two-way directional valve which in its first position guides the exhaust gas coming from refined gas duct to the exhaust gas duct and in its second position guides the refined synthesis gas coming from refined gas duct in to the internal combustion engine through the refined gas connection duct.

2. The combined heat and power plant according to claim 1, further comprising air-inlet connected into the raw gas burner to provide oxygen to the raw gas burner.

3. The combined heat and power plant according to claim 1, wherein the raw gas burner comprises a burning chamber into which, at least one heat exchanging channel of the heat exchanger is arranged to conduct the heat formed in the burning chamber to the heating medium of the heat exchanger.

4. The combined heat and power plant according to claim 1, wherein the heat exchanger comprises a first heating section where the heating medium is heated by means of the heat formed by burning the raw gas in the raw gas burner.

5. The combined heat and power plant according to claim 4, wherein the heat exchanger comprises a second heating section, wherein the heating medium is heated by the hot raw gas or exhaust gas stream arranged to flow through the heat exchanging surfaces of the second heating section of the heat exchanger.

6. The combined heat and power plant according to claim 1, wherein the combined heat and power plant comprises a common exhaust gas duct, to which, the cooled exhaust gas coming from the raw gas burner is conducted through the refined gas duct and from the internal combustion engine through an exhaust gas connection duct.

7. The combined heat and power plant according to claim 6, wherein the refined gas duct is connected to the exhaust gas duct through a shut-off valve to prevent the flow of refined synthesis gas from entering to the exhaust gas duct during the use of internal combustion engine.

8. The combined heat and power plant according to claim 6, wherein the refined gas duct is connected to the internal combustion engine through a refined gas connection duct having a shut-off valve to prevent the exhaust gas of the raw gas burner flowing through the refined gas duct to the exhaust gas duct from entering to the internal combustion engine during the use of raw gas burner.

9. The combined heat and power plant according to claim 6, wherein the internal combustion engine includes an exhaust gas connection duct with a shut-off valve to prevent the exhaust gas flowing from the refined gas duct to the exhaust gas duct from entering to the internal combustion engine through the exhaust gas connection duct.

10. The combined heat and power plant according to claim 1, further comprising a second filtration unit for cooled raw synthesis gas or either cooled exhaust gas arranged after the heat exchanger and connected by an input duct to the second raw gas duct and by an output duct to the refined gas duct.

11. A method for improving the burning processes in a combined heat and power plant according to claim 1, comprising:

burning the raw synthesis gas in a raw gas burner after a gasifier, or exchanging heat of the hot raw synthesis gas produced in the gasifier into the heating medium of a heat exchanger arranged after the gasifier to reduce the temperature of the hot raw synthesis gas, cleaning the cooled raw synthesis gas in a filtration unit to produce refined synthesis gas, utilizing the refined synthesis gas in an internal combustion engine as a fuel of the internal combustion engine to produce mechanical power, wherein the heating medium of the heat exchanger is heated by the heat formed in the raw gas burner in case when the raw synthesis gas is burnt in the raw gas burner.

12. The method according to claim 11, wherein raw synthesis gas is burnt in a burning chamber of the raw gas burner arranged in connection with the heat exchanger, such that heat produced in the burning chamber is exchanged into the heating medium of the heat exchanger.

13. The method according to claim 12, wherein air is provided into the burning chamber through at least one air-inlet connected to the burning chamber of the raw gas burner.

14. The method according to claim 11, wherein the heating medium is circulated through at least one heating medium channel arranged in connection a burning chamber of the raw gas burner, such that heat formed in burning process of the raw synthesis gas is conducted into the heating medium and thereby the temperature of the exhaust gas formed in the burning process of the raw synthesis gas is reduced.

15. The method according to claim 11, wherein the cooled raw gas and the cooled exhaust gas of the raw gas burner is cleaned by conducting the cooled raw gas and the cooled exhaust gas through at least one filtration unit.

16. The method according to claim 15, wherein the cooled raw gas is cleaned by conducting the cooled raw gas through a first filtration unit and wherein the cooled exhaust gas is cleaned by conducting the cooled exhaust gas through a second filtration unit.

17. The method according to claim 16, wherein the second filtration unit is provided with filter enduring higher temperature than the filter of the first filtration unit.

18. The method according to claim 11, wherein the cooled exhaust gas of the raw gas burner and the exhaust gas formed in the internal combustion engine are led in to a common exhaust gas duct.

19. The method according to claim 18, wherein the cleaned exhaust gas of the raw gas burner and the exhaust gas of the internal combustion engine is blown out from the common exhaust gas duct by means of a flare blower at the end of the common exhaust gas duct.

* * * * *